(12) United States Patent
Koshiishi et al.

(10) Patent No.: US 11,698,616 B2
(45) Date of Patent: Jul. 11, 2023

(54) MANAGING APPARATUS AND MANAGING SYSTEM

(71) Applicant: FANUC CORPORATION, Yamanashi (JP)

(72) Inventors: Hikaru Koshiishi, Yamanashi (JP); Yasuyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 316 days.

(21) Appl. No.: 16/783,434

(22) Filed: Feb. 6, 2020

(65) Prior Publication Data
US 2020/0257261 A1    Aug. 13, 2020

(30) Foreign Application Priority Data

Feb. 7, 2019   (JP) .................. 2019-020957

(51) Int. Cl.
*G05B 19/40*       (2006.01)
*G05B 19/401*      (2006.01)
*G05B 19/418*      (2006.01)
*F24F 11/49*       (2018.01)
*G06N 20/00*       (2019.01)

(52) U.S. Cl.
CPC ............ *G05B 19/401* (2013.01); *F24F 11/49* (2018.01); *G05B 19/41875* (2013.01); *G06N 20/00* (2019.01); *G05B 2219/37378* (2013.01); *G05B 2219/37434* (2013.01)

(58) Field of Classification Search
CPC ........... G05B 23/02; F24F 11/49; Y02P 90/02
See application file for complete search history.

(56) References Cited

U.S. PATENT DOCUMENTS

| 2009/0018781 | A1  | 1/2009 | Diezel et al. |
| 2009/0204267 | A1* | 8/2009 | Sustaeta ................. G06Q 10/04 700/36 |
| 2011/0015877 | A1  | 1/2011 | Okita et al. |
| 2013/0060373 | A1  | 3/2013 | Otsuki |
| 2016/0214805 | A1* | 7/2016 | Ebihara .............. B23Q 11/0891 |

(Continued)

FOREIGN PATENT DOCUMENTS

| JP | 2000-315111 A | 11/2000 |
| JP | 2002268715 A  | 9/2002 |

(Continued)

*Primary Examiner* — Santosh R Poudel
(74) *Attorney, Agent, or Firm* — Hauptman Ham, LLP

(57) ABSTRACT

A managing apparatus includes: a data collecting unit that collects at least quality information on a workpiece having been machined by a first machine tool and operational information on other machine, an analyzing unit that performs an analysis for determining correlation between the quality information on a workpiece having been machined by the first machine tool and the operational information on the other machine, an operation plan making unit that makes an operation plan, based on the correlation determined by the analyzing unit, for imposing a restriction on an operation of the other machine to reduce vibrations to be transmitted to the first machine tool during high-precision machining performed by the first machine tool, and an operation instruction providing unit that provides an operation instruction to the other machine based on the operation plan made by the operation plan making unit.

15 Claims, 8 Drawing Sheets

(56) References Cited

U.S. PATENT DOCUMENTS

| | | | |
|---|---|---|---|
| 2018/0265316 A1* | 9/2018 | Bhide | B65H 7/06 |
| 2018/0275639 A1* | 9/2018 | Shinoda | G05B 19/404 |
| 2020/0254642 A1* | 8/2020 | Yanakawa | B23B 3/00 |
| 2020/0282502 A1* | 9/2020 | Nakaya | B23Q 15/0075 |

FOREIGN PATENT DOCUMENTS

| | | | |
|---|---|---|---|
| JP | 2002373191 A | | 12/2002 |
| JP | 2003-162304 A | | 6/2003 |
| JP | 2009526296 A | | 7/2009 |
| JP | 2013058035 A | | 3/2013 |
| JP | 2016156573 A | | 9/2016 |
| JP | 2018202560 A | * | 12/2018 |

* cited by examiner

FIG.4

| ID INFORMATION | MACHINE NAME | MACHINE TYPE | INSTALLATION POSITION | CONNECTION STATUS | ⋮ |
|---|---|---|---|---|---|
| 1 | δ-DiBADV1 | MACHINE TOOL | FACTORY A-2F-201 | 192.168.1.101 | ⋮ |
| 2 | δ-DiBADV2 | MACHINE TOOL | FACTORY A-2F-201 | 192.168.1.102 | ⋮ |
| 3 | δ-DiBADV3 | MACHINE TOOL | FACTORY A-2F-201 | 192.168.1.103 | ⋮ |
| 4 | CR-7iA1 | ROBOT | FACTORY A-2F-201 | 192.168.1.104 | ⋮ |
| 5 | HV-235 | MIST COLLECTOR | FACTORY A-2F-201 | HOST DEVICE=[1] | ⋮ |
| 6 | ZEAB-112 | AIR CONDITIONER | FACTORY A-2F-201 | 192.168.1.201 | ⋮ |
| 7 | ZEAB-114 | AIR CONDITIONER | FACTORY A-1F-101 | 192.168.0.201 | ⋮ |
| ⋮ | ⋮ | ⋮ | ⋮ | ⋮ | ⋮ |

FIG.5

| ID INFORMATION ON MACHINE TOOL | ID INFORMATION ON OTHER EDGE COMPUTER | CORRELATIVITY |
|---|---|---|
| 1 | 2 | HIGH |
| 1 | 3 | LOW |
| 1 | 4 | MIDDLE |
| 1 | 5 | HIGH |
| 1 | 6 | LOW |
| 1 | 7 | MIDDLE |
| 2 | 1 | HIGH |
| 2 | 3 | MIDDLE |
| 2 | 4 | MIDDLE |
| ... | ... | ... |

MANAGING APPARATUS AND MANAGING SYSTEM

RELATED APPLICATIONS

The present application claims priority to Japanese Patent Application Number 2019-020957 filed Feb. 7, 2019, the disclosure of which is hereby incorporated by reference herein in its entirety.

BACKGROUND OF THE INVENTION

1. Field of the Invention

The present disclosure relates to a managing apparatus and a managing system, and particularly to a managing apparatus and a managing system that manage the operations of a plurality of industrial machines installed in a manufacturing site such as a factory.

2. Description of the Related Art

Nowadays, many industrial machines such as machine tools and robots are installed in a manufacturing site such as a factory, and these industrial machines are operated under the control of a managing apparatus or a managing system for mass production (See JP 2002-373191 A, for example). Under these conditions, machine tools such as machining centers often machine IT parts or exteriors of ornaments with high precision (See JP 2013-058035 A, for example).

When an industrial machine is operated for manufacturing or transferring products, vibrations are caused. The vibrations caused by the industrial machine may propagate through a floor and adversely affect the operation of other industrial machine. The effect is stronger, for example, when the strength of the floor on which the industrial machines are installed is not sufficient. For example, the vibrations caused by roughing performed by a machining center and the vibrations caused by the operation of a peripheral machine such as a mist collector and a transferring machine may be transmitted to other machining center through a floor and the like. If the other machining center is performing finishing with high precision on a workpiece at the time, the surface precision of the workpiece may significantly be deteriorated.

To solve such a problem in a manufacturing site, a solution can be conceived in which the setting values for rapid traverse, cutting feed and acceleration/deceleration for tool changing are lowered for all the machines installed on a floor, for example. In this case, the vibrations are reduced to the utmost minimum, which prevents the vibrations from affecting the finishing. This method, however, causes another problem of the decrease in the overall work efficiency in the manufacturing site. Thus, this method cannot be a practical solution.

Another solution can be conceived in which the layout of the industrial machines in a manufacturing site is changed. For example, a machining center for finishing and other machining center can be installed on different floors. However, changing the positions of many heavy industrial machines is very troublesome. Moreover, specializing a machine in one specific machining decreases the overall machining efficiency in the manufacturing site (because the machining center specialized in finishing cannot be used for other purposes). Thus, a more flexible solution is required.

SUMMARY OF THE INVENTION

One aspect of the present disclosure is a managing apparatus for factory equipment, the managing apparatus being used in a manufacturing site in which a first machine tool for high-precision machining and at least one other machine are in operation, and used for managing an operation of the other machine, including: an analyzing unit that performs an analysis for determining correlation between quality information on a workpiece having been machined by the first machine tool and operational information on the other machine; an operation plan making unit that makes an operation plan, based on the correlation determined by the analyzing unit, for imposing a restriction on an operation of the other machine to reduce vibrations to be transmitted to the first machine tool during high-precision machining performed by the first machine tool; and an operation instruction providing unit that provides an operation instruction to the other machine based on the operation plan made by the operation plan making unit.

Another aspect of the present disclosure is a managing system having a plurality of managing apparatuses for factory equipment, the apparatuses being connected with each other via a network, in which an analytical result provided by the analyzing unit can be shared with each other among the plurality of managing apparatuses.

The aspects of the present disclosure enable the establishment of a machine environment that facilitates high-precision machining without significantly decreasing the machining efficiency in a manufacturing site.

BRIEF DESCRIPTION OF THE DRAWINGS

The objects and characteristics of the present disclosure will be clarified by reading the following detailed description of the preferred embodiments with reference to the accompanying drawings.

FIG. 4 is a table showing exemplary management information;

FIG. 5 is a table showing exemplary correlation information;

DETAILED DESCRIPTION OF THE PREFERRED EMBODIMENTS

Embodiments of the present disclosure will now be described with reference to the drawings.

Figure 1:
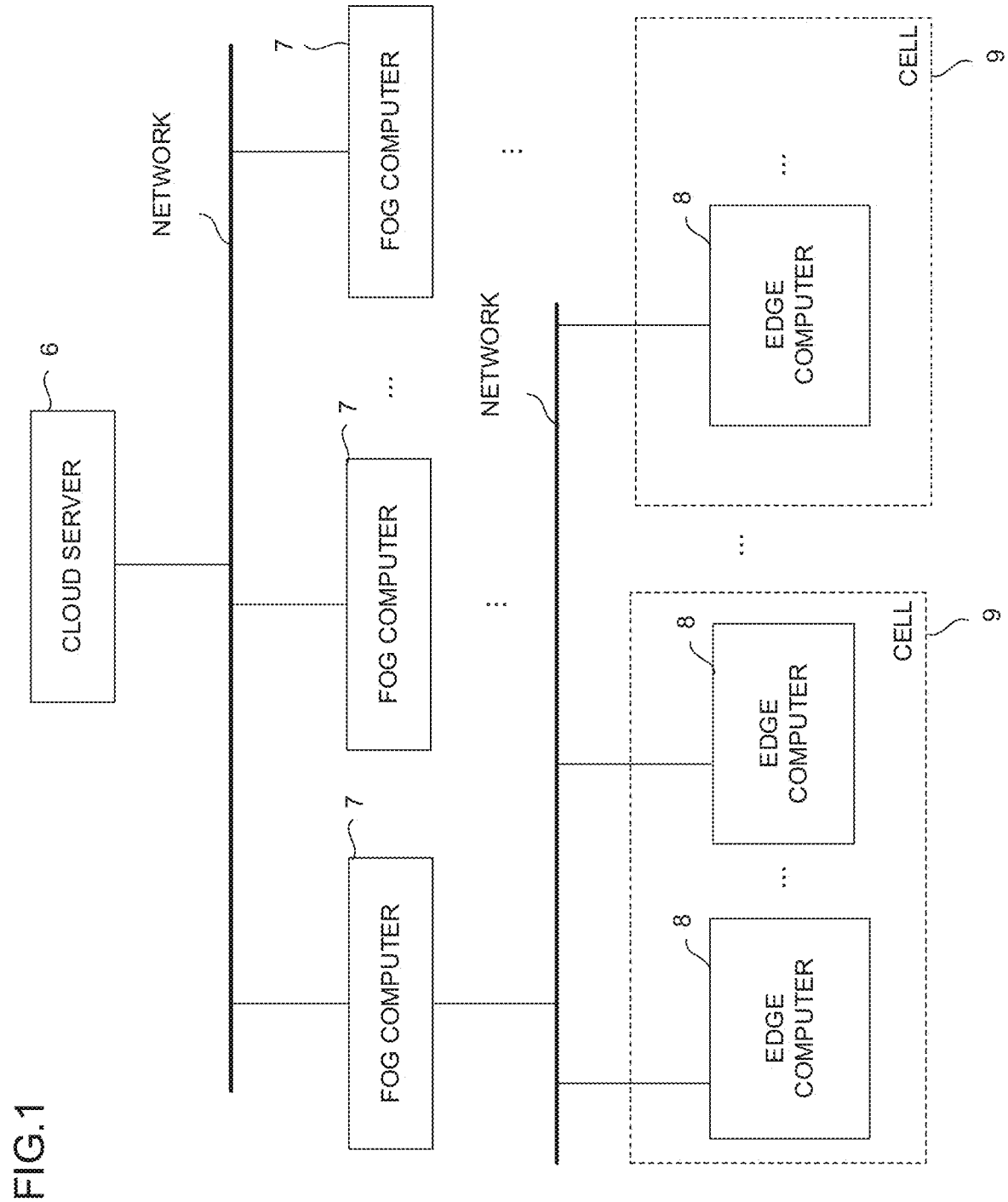
FIG. 1 is a schematic diagram showing the operating environment of a managing apparatus according to an embodiment.

FIG. 1 is a schematic diagram showing the operating environment of a managing apparatus according to an embodiment of the present disclosure. As shown in FIG. 1, the managing apparatus of the embodiment of the present disclosure operates in an environment in which a plurality of devices including a cloud server 6, a fog computer 7, an edge computer 8 are connected to a wired/wireless network individually. The system shown in FIG. 1 as an example has a logical three-layered hierarchical structure. The structure has a first layer including the cloud server 6, a second layer including the fog computer 7, and a third layer including the edge computer 8 (such as a robot controller for controlling a robot, a controller for controlling a machine tool, and an air conditioner installed in a manufacturing site, in a cell 9). In this system, the managing apparatus of the embodiment of the present disclosure can be implemented on any of the cloud server 6, the fog computer 7, and the edge computer 8. The managing apparatus can share data with each device via the network, and collect and analyze, in the fog computer 7 or the cloud server 6, a large amount of various kinds of data obtained by the edge computer 8. Moreover, the managing apparatus can control the operation of each edge computer 8 based on the analytical result. In the system shown in FIG. 1 as an example, a plurality of cells 9 are provided for each local factory (for example, a factory has one cell 9 on each floor). Also, in this system, the cells 9 are managed in a predetermined unit (for example, the cells 9 in one factory are considered as one unit, or the cells 9 in a plurality of factories belonging to one manufacture are considered as one unit) by the fog computer 7 in the upper layer. The data collected and analyzed by the fog computer 7 can then be collected and analyzed by the cloud server 6 in the further upper layer, for example. The information obtained through the data collection and analysis performed by the cloud server 6 may be used for the control over each edge computer 8, for example.

Figure 2:
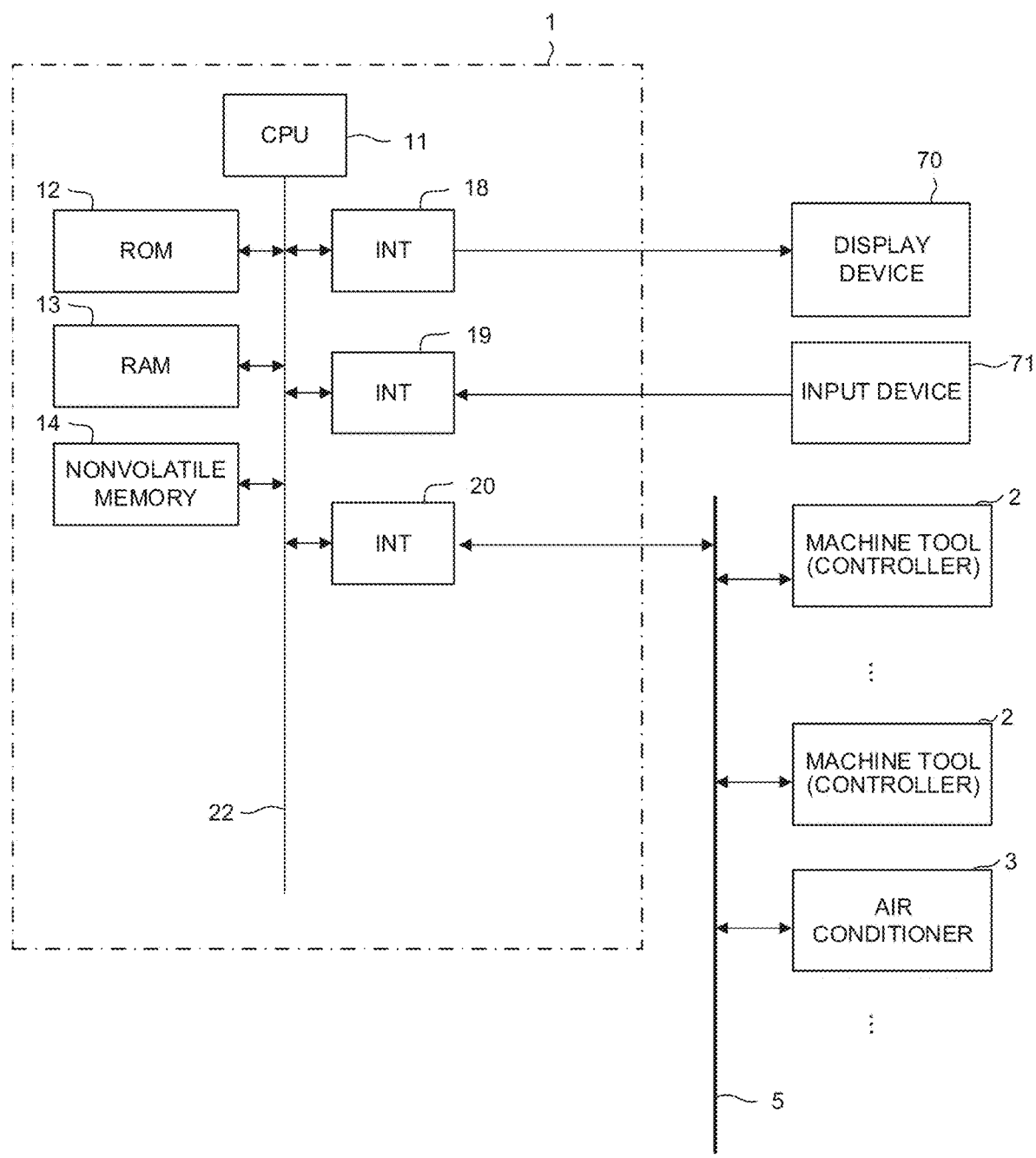
FIG. 2 is a schematic diagram showing the hardware structure of a managing apparatus according to an embodiment.

FIG. 2 is a schematic diagram showing the hardware structure of a managing apparatus 1 according to an embodiment of the present disclosure. The managing apparatus 1 of the present embodiment can be implemented as the edge computer 8, the fog computer 7, or the cloud server 6 shown in FIG. 1 as an example. In the present embodiment, the managing apparatus 1 is implemented as the fog computer 7 that manages the operations of the plurality of edge computers 8, for example.

The managing apparatus 1 of the present embodiment includes a central processing unit (CPU) 11 that controls the whole managing apparatus 1. The CPU 11 is connected with a read only memory (ROM) 12 via a bus 22. The CPU 11 reads a system program stored in the ROM 12 and controls the whole managing apparatus 1 according to the system program. A random access memory (RAM) 13 stores data such as temporary calculation data, display data to be displayed on a display device 70, and various kinds of data input by an operator with an input device 71.

A nonvolatile memory 14 includes a memory and a solid state drive (SSD), which are backed up by a battery (not shown). The nonvolatile memory 14 is configured to be a memory that retains a memory status even when a power source of the managing apparatus 1 is turned off. The nonvolatile memory 14 has a setting area that stores setting information on the operation of the managing apparatus 1. The nonvolatile memory 14 stores data input through the input device 71 and various kinds of data obtained from an edge computer that is under the control of the managing apparatus 1, such as a machine tool 2 and an air conditioner 3. The data stored in the nonvolatile memory 14 includes operational information on the machine tool 2, quality information on a workpiece having been machined by the machine tool 2, and operational information on the air conditioner 3. The nonvolatile memory 14 also stores data read via an external storage (not shown) or a network, for example. The program and various kinds of data stored in the nonvolatile memory 14 may be loaded in the RAM 13 to be executed/used. The ROM 12 stores a prewritten system program including a known analysis program for analyzing various kinds of data.

The managing apparatus 1 is connected to the wired/wireless network 5 via an interface 20. The network 5 has connections with devices such as at least one machine tool 2, the air conditioner 3 installed in a manufacturing site, or the managing apparatus for managing the air conditioner 3. These devices connected to the network 5 exchange data with the managing apparatus 1.

The display device 70 displays various kinds of data such as data read into the memory and data obtained through the execution of a program and the like, which is output via an interface 18. The input device 71 includes a keyboard and a pointing device. An operator can use the input device 71 to input instructions, data, and the like, which are sent to the CPU 11 via the interface 19.

Figure 3:
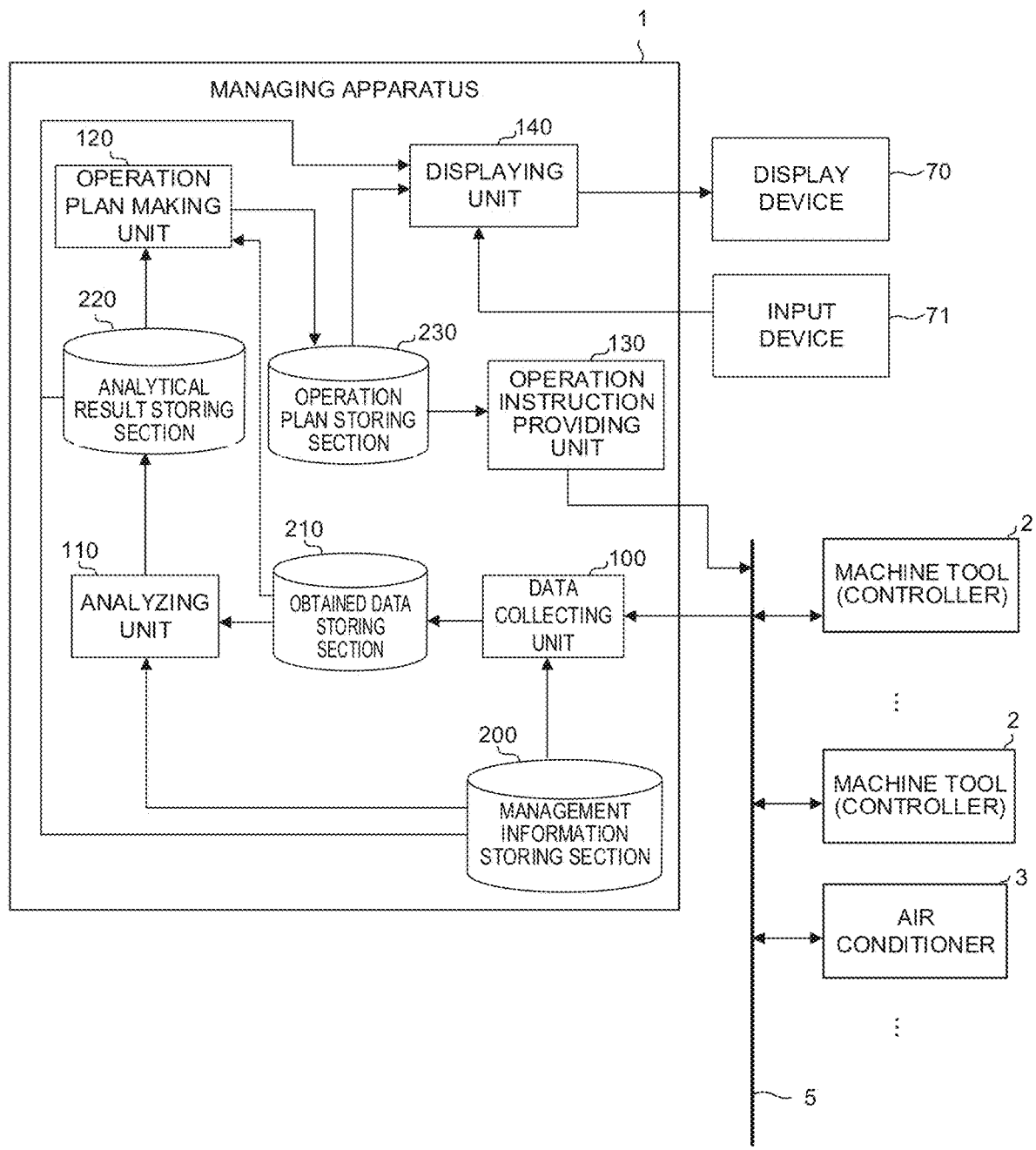
FIG. 3 is a schematic functional block diagram of a managing apparatus according to a first embodiment.

FIG. 3 is a schematic functional block diagram of the managing apparatus 1 according to a first embodiment. Each function of the functional block shown in FIG. 3 is provided by executing the system program by the CPU 11 of the managing apparatus 1 shown in FIG. 2 to control the operation of each part of the managing apparatus 1.

The managing apparatus 1 of the present embodiment includes a data collecting unit 100, an analyzing unit 110, an operation plan making unit 120, an operation instruction providing unit 130, and a displaying unit 140. The data collecting unit 100 collects data to be analyzed from each edge computer that is under the control of the managing apparatus 1 (such as the machine tool 2, a peripheral device of the machine tool 2, and the air conditioner 3). The analyzing unit 110 analyzes the data collected by the data collecting unit 100. The operation plan making unit 120 makes an operation plan for each edge computer based on the analytical result provided by the analyzing unit 110. The operation instruction providing unit 130 provides an operation instruction to each edge computer based on the operation plan for the edge computer made by the operation plan making unit 120. The displaying unit 140 displays the analytical result provided by the analyzing unit 110 and the operation plan made by the operation plan making unit 120, on the display device 70. The nonvolatile memory 14 of the managing apparatus 1 includes a management information storing section 200, an obtained data storing section 210, an analytical result storing section 220, and an operation plan storing section 230. The management information storing section 200 stores the management information on each edge computer that is under the control of the managing apparatus 1. The obtained data storing section 210 stores the data collected by the data collecting unit 100. The analytical result storing section 220 stores the analytical result provided by the analyzing unit 110. The operation plan storing section 230 stores the operation plan made by the operation plan making unit 120.

The data collecting unit 100 is a functional unit that collects information from each edge computer that is under the control of the managing apparatus 1, such as the machine tool 2 and the air conditioner 3, based on the management information stored in the management information storing section 200; and causes the obtained data storing section 210 to store the information. The information on each edge computer collected by the data collecting unit 100 includes the operational information on the edge computer and the information on an environment detected by the edge computer. For example, the data collecting unit 100 obtains, from each machine tool 2 as an edge computer, the operational information on the machine tool 2 (such as the speed, acceleration, and moving frequency of an axis of the machine tool 2) and the information on the type of machining performed by the machine tool 2 (such as roughing and finishing). The data collecting unit 100 also obtains, from each machine tool 2, the quality information on a workpiece having been machined by the machine tool 2 (such as the dimension accuracy and surface quality of the workpiece) and the operational information on a peripheral device providing support for machining performed by the machine tool 2, for example. The data collecting unit 100 may obtain a machining program to be executed by the machine tool 2, the values detected at several sites of the machine tool 2, the operational information on the machine tool 2 that is under the control of the production planning device or the like, and the data measured or detected by a sensor or the like attached to the machine tool 2, for example. The data collecting unit 100 may also obtain the operational information, machining information, quality information on the machine tool 2 based on the information input into the machine tool 2 by an operator, for example. The data collecting unit 100 may also obtain the past operational and environmental information on each edge computer as well as the present operational and environmental information on each edge computer. The data collecting unit 100 may also obtain the information on the future (planned) operation of each edge computer. The data collecting unit 100 may obtain the operational information and information on set temperature of the air conditioner 3 as an edge computer and the environmental information on the air conditioner 3 (such as an environmental temperature) from the air conditioner 3 or the managing apparatus (not shown) for managing the air conditioner 3, for example.

FIG. 4 is a table showing the management information on each edge computer stored in the management information storing section 200. The management information stored in the management information storing section 200 includes the identification information for identifying each edge computer that is under the control of the managing apparatus 1 and the information on the edge computer. The information on each edge computer included in the management information includes information on the name of the edge computer, the type of the edge computer, the installation position of the edge computer, and the connection status of the edge computer, for example. The information on the installation position of each edge computer included in the management information may include the factory name, the floor name, the room name, and the coordinate position in the room in which the edge computer is installed, for example. The installation position of each edge computer may be defined by the latitude, longitude, and altitude, for example. The information on the connection status of each edge computer included in the management information may be shown using a network address that is used for connecting the edge computer to the managing apparatus 1 via the network 5. The information on the connection status of each edge computer may be shown using the identification information on other edge computer to which the edge computer is attached (In the example of FIG. 4, the mist collector with the identification number 5 is attached to the host device, the machine tool 2 with the identification number 1, so the information on the mist collector with the identification number 5 can be obtained through the host device, the machine tool 2 with the identification number 1). Each edge computer may be associated with the information on other device that provides information on the edge computer (not shown in FIG. 4). For example, when the edge computer is a machine tool, the machine tool may be associated with the information on other device such as the production planning device that manages the machine tool and the CAD/CAM device that provides machining information to the machine tool. The management information stored in the management information storing section 200 should include at least the information necessary for collecting the data on each edge computer and the information necessary for determining the positional relationship(s) between the edge computers.

The analyzing unit 110 is a functional unit that analyzes the data collected by the data collecting unit 100 (the data stored in the obtained data storing section 210) to determine the correlation between the result of machining performed by each machine tool 2 and the operational information on other edge computer (such as other machine tool 2 and the air conditioner 3). The analyzing unit 110 causes the analytical result storing section 220 to store the analytical result. The analyzing unit 110 analyzes the operational information on each edge computer and the quality information on a workpiece having been machined by each machine tool 2 stored in the obtained data storing section 210 to determine the correlation between the two sets of information, for example.

The analyzing unit 110 refers to the installation position of each edge computer stored in the management information storing section 200 and retrieves the information on a pair of an edge computer and other edge computer to be analyzed. The pair to be retrieved for analysis has a certain positional relationship between the edge computer and the other edge computer. The certain positional relationship means the positional relationship between the other edge computer and the machine tool 2 as the edge computer that will probably be affected by the vibrations caused by the operation of the other edge computer. For example, the pair of the machine tool 2 and other edge computer to be retrieved for analysis may be a pair of the machine tool 2 and other edge computer installed in the same room, a pair of the machine tool 2 and other edge computer installed on the same floor, and a pair of the machine tool 2 installed on an upper floor and the air conditioner 3 as other edge computer installed on a lower floor, for example.

The analyzing unit 110 performs an analysis of the retrieved pair for determining the correlation between the product quality of a workpiece having been machined by the machine tool 2 and the operational information on the other edge computer during the finishing of the workpiece. The analyzing unit 110 determines the correlation between the product quality of a workpiece having been machined by the machine tool 2 and the operational information on the other edge computer during the finishing of the workpiece by know analytical methods such as regression analysis and correlation analysis. The analyzing unit 110 may perform a regression analysis or a correlation analysis with a target variable of a quality value calculated based on the product quality of a workpiece having been machined by the machine tool 2, and an explanatory variable of an operational scale value calculated based on the operational information on the other edge computer according to a predetermined criterion, for example. The operational scale value here means a value indicating the strength of vibrations or a value indicating the vibrational energy at the other edge computer, for example. This enables the analysis for determining the correlation between the product quality of a workpiece having been machined by the machine tool 2 and the operational information on the other edge computer during the finishing of the workpiece. The quality value indicating the quality of a workpiece having been machined by the machine tool 2 is calculated based on the quality information on the workpiece having been machined by the machine tool 2, which is stored in the obtained data storing section 210, according to a predetermined criterion. This quality value may be a value calculated using a predetermined function that has an argument of a value indicating the precision or surface quality of the machined workpiece, which has been obtained by measuring the machined workpiece in advance (the function produces a higher value with a higher precision or surface quality value), for example. The operational scale value may be a value calculated using a predetermined function that has an argument of a parameter value related to the operation that causes vibrations at the other edge computer (such as the speed, acceleration, and moving frequency of an axis of the machine tool 2 or a robot, or an air volume of the air conditioner 3) (the function produces a higher value with a higher parameter value such as a higher acceleration that significantly affects the vibrations at the other edge computer).

The analyzing unit 110 should preferably perform an analysis for determining the correlation between the machine tool 2 and other edge computer using the data obtained under the condition that no edge computers are operating except the machine tool 2 and the other edge computer, among the data collected by the data collecting unit 100. To generate such data, an operator may have a process for data collection while operating only the machine tool 2 and other edge computer different from the machine tool 2 after installing the edge computers in a manufacturing site. Alternatively, the analyzing unit 110 may perform an analysis for determining the correlation between the machine tool 2 and two or more other edge computers based on the data obtained under the environment that the machine tool 2 and the two or more other edge computers are operating. The vibrations caused by the operations of the two or more other edge computers are combined, and the combined vibrations affect the finishing performed by the machine tool 2. The analyzing unit 110 extracts the vibration component of each edge computer from the combined vibrations and analyses the correlation between the machine tool 2 and each of the two or more other edge computers based on the difference between the respective vibration components.

FIG. 5 is a table showing exemplary correlation information determined based on the analytical result provided by the analyzing unit 110 and stored in the analytical result storing section 220. The correlation information includes the identification information on the machine tool 2, the identification information on other edge computer, and the correlativity between the machine tool 2 and the other edge computer. The correlativity here means the information on the correlation between the product quality of a workpiece having been machined by the machine tool 2 and the operational information of other edge computer during the finishing of the workpiece, for example. In the example of FIG. 5, the correlativity between the product quality of a workpiece having been machined by the machine tool 2 and the operational information of other edge computer during the finishing of the workpiece is shown in three indications: high, middle, and low. The correlativity may be a correlation coefficient value or other value, for example. When the analyzing unit 110 generates a correlation function, a correlation model, or the like indicating the characteristics of the correlativity between the product quality of a workpiece having been machined by the machine tool 2 and the operational information of other edge computer during the finishing of the workpiece, the generated correlation function or correlation model may be stored in the analytical result storing section 220.

The operation plan making unit 120 is a functional unit that makes an operation plan based on the data collected by the data collecting unit 100 (the data stored in the obtained data storing section 210) and the correlation information generated by the analyzing unit 110 (the correlation information stored in the analytical result storing section 220). The operation plan is designed to impose or lift a predetermined restriction on or from the operation of an edge computer that is under the control of the managing apparatus 1. The operation plan making unit 120 causes the operation plan storing section 230 to store the operation plan. When the operation plan making unit 120 expects that the machine tool 2 will perform finishing, with reference to the data collected by the data collecting unit 100, for example; the operation plan making unit 120 identifies the edge computer having high correlativity with the machine tool 2 based on the analytical result provided by the analyzing unit 110. The operation plan making unit 120 then determines the operational status of the edge computer having high correlativity with the machine tool 2 that will perform finishing. If the operation plan making unit 120 determines that the edge computer is in the operational status that will affect the finishing performed by the machine tool 2, the operation plan making unit 120 makes the operation plan that will restrict the operation of the edge computer by reducing the moving speed or acceleration of an axis, for example, and causes the operation plan storing section 230 to store the operation plan. The operation plan making unit 120 also makes the operation plan that will lift the restriction from the operation of the edge computer once the finishing is completed by the machine tool 2, and causes the operation plan storing section 230 to store the operation plan.

The operation plan making unit 120 may make the operation plan that will impose a restriction on the operation of the edge computer according to a predetermined operation restriction rule. The operation restriction rule to be used by the operation plan making unit 120 is determined by the relationship of the degree of the correlativity between the product quality of a workpiece having been machined by the machine tool 2 and the operational information on the machine tool 2 as other edge computer during the finishing of the workpiece, and the predetermined restriction on an controllable operation of the other edge computer. The operation plan making unit 120 may use the following operation restriction rules, for example. When there is high correlativity between the product quality of a workpiece having been machined by the machine tool 2 and the operational information of the machine tool 2 as other edge computer during the finishing of the workpiece, a restriction is imposed on the movement of an axis of the machine tool 2 as the other edge computer. Specifically, a restriction is imposed on the movement of the axis for reducing the moving speed of the axis to a predetermined maximum speed of Flim1 or less and reducing the acceleration of the axis to a predetermined maximum acceleration of Falim1 or less. Alternatively, when there is middle or more correlativity between the product quality of a workpiece having been machined by the machine tool 2 and the operational information on the air conditioner 3 as other edge computer during the finishing of the workpiece, a restriction may be imposed for reducing the air volume of the air conditioner 3 to a low level or less. The operation restriction rule may be designed to impose a restriction only on a specific operation of other edge computer. For example, when the other edge computer is a machine tool; the horizontal axis movement has little effect on other machine tool, however, the vertical axis movement has significant effect on other machine tool (since the vertical axis movement causes vibrations against the floor). Thus, the operation restriction rule may be designed to impose a restriction only on the vertical (such as z-axis) axis movement.

The operation plan making unit 120 may make the operation plan that imposes a restriction on the operation of an edge computer according to a predetermined operation restriction function. The operation restriction function to be used by the operation plan making unit 120 is determined as the function that has an argument of the correlativity between the product quality of a workpiece having been machined by the machine tool 2 and the operational information on the machine tool 2 as other edge computer during the finishing of the workpiece and outputs a parameter of a controllable operation of the other edge computer. When the analyzing unit 110 generates a correlation function or a correlativity model as the analytical result, the operation restriction rule and the operation restriction function may be determined using the correlation function or the correlation model.

Figure 6:
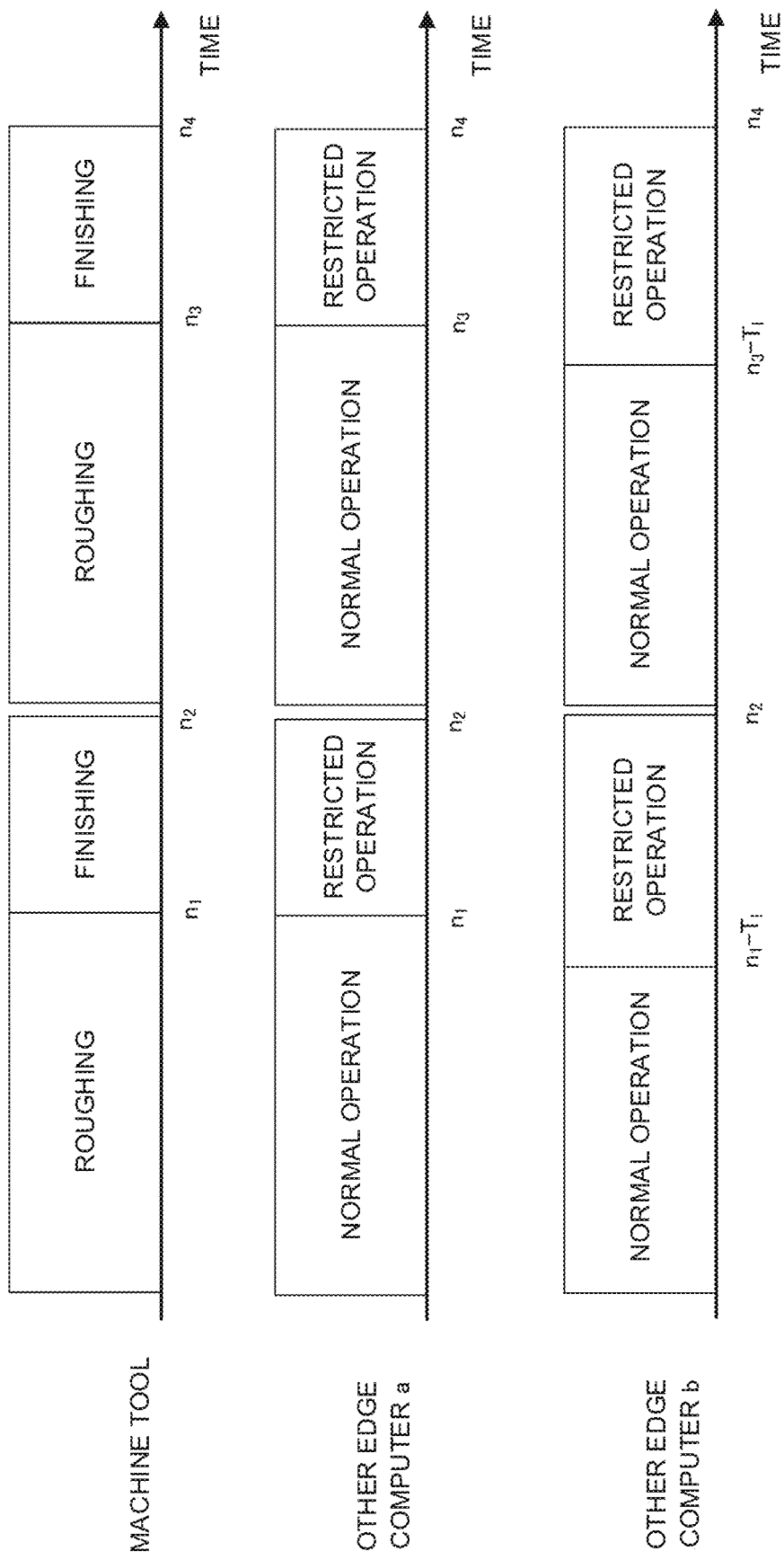
FIG. 6 is a diagram showing an exemplary operation plan made by an operation plan making unit.

The operation plan made by the operation plan making unit 120 may also determine the time zone in which a restriction is imposed on the operation of other edge computer. As shown in FIG. 6, the operation plan making unit 120 expects that the machine tool 2 will perform finishing in the time zone between n1 and n2, with reference to the data collected by the data collecting unit 100. In this case, the operation plan making unit 120 makes the operation plan that will impose a restriction on the operation of other edge computer a in the time zone between n1 and n2 to prevent the vibrations that affect the finishing performed by the machine tool 2. The operation plan making unit 120 causes the operation plan storing section 230 to store the operation plan. If other edge computer b has a time lag T1 between the start of the operation restriction and the cease of the vibrations that affect the finishing performed by the machine tool 2, the operation plan making unit 120 may make an operation plan considering the time lag T1.

The operation instruction providing unit 130 is a functional unit that provides an operation instruction to each edge computer based on the operation plan made by the operation plan making unit 120 (the operation plan stored in the operation plan storing section 230). When the operation plan is designed to impose a restriction on the operation of an edge computer, the operation instruction providing unit 130 provides an instruction for imposing the restriction on the operation of the target edge computer. When the operation plan is designed to lift a restriction from the operation of an edge computer, the operation instruction providing unit 130 provides an instruction for lifting the restriction from the operation of the target edge computer.

Figure 7:
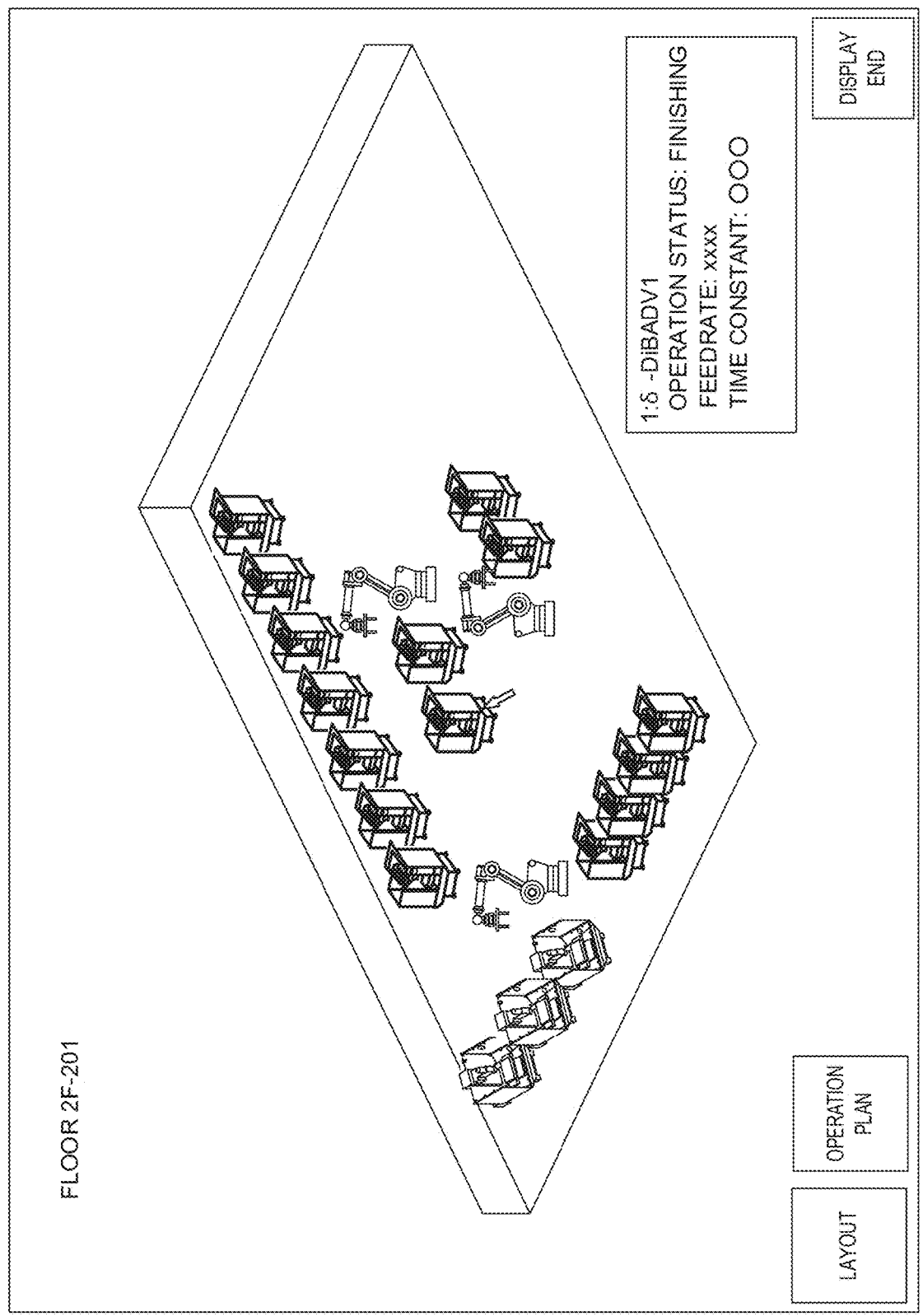
FIG. 7 is a diagram showing an exemplary screen displayed on a display device by a displaying unit.

The displaying unit 140 is a functional unit that displays the management information stored in the management information storing section 200, the data collected by the data collecting unit 100 (the data stored in the obtained data storing section 210), the operation plan made by the operation plan making unit 120, and the like, on the display device 70. As shown in FIG. 7 as an example, the displaying unit 140 displays the edge computers that are under the control of the managing apparatus 1 on the display device based on the management information stored in the management information storing section 200 and the data collected by the data collecting unit 100, for example. The displaying unit 140 may display the operation status of the edge computer selected through the input device 71 on the display device 70. When a certain edge computer is selected, the displaying unit 140 may emphasize, depending on the correlativity with the selected edge computer, other edge computer by changing the color of the other edge computer (For example, the color of the other edge computer with higher correlativity becomes vivider red) or marking it. The displaying unit 140 may also display the operation plan of each edge computer shown in FIG. 6 along the time line. The displaying unit 140 may allow an operator who is looking at the display to edit the operation plan stored in the operation plan storing section 230 with the input device 71.

The managing apparatus 1 with the above structure according to the present embodiment performs an analysis for determining the correlativity between the machine tool 2 and other edge computer among the edge computers under its control. Based on the analytical result, the managing apparatus 1 imposes a restriction on the operation of the other edge computer during the finishing performed by the machine tool 2, which enables the restriction to be imposed only on the edge computer that will affect the finishing. This enables the establishment of a machining environment that facilitates high-precision machining without significantly decreasing the overall machining efficiency in a manufacturing site.

As one variation of the managing apparatus 1 of the present embodiment, the operation plan making unit 120 may modify the operation plan for each machine tool made by the production planning device to make a production plan for a plurality of machine tools as edge computers that is designed to instruct the plurality of machine tools to perform roughing at the same time and then perform finishing at the same time. A machine tool causes stronger vibrations during roughing and causes weaker vibrations during finishing. Thus, the production plan designed to perform simultaneous roughing and simultaneous finishing at a plurality of machine tools enables the establishment of a machining environment that facilitates high-precision machining without significantly decreasing the overall machining efficiency in a manufacturing site.

As another variation of the managing apparatus 1 of the present embodiment, the analyzing unit 110 may perform the analysis by known machine learning. In this case, the analyzing unit 110 builds a learning model indicating the correlativity between a plurality of operation parameters of other edge computer and the product quality of a workpiece having been machined by the machine tool 2, for example. Using this learning model, the analyzing unit 110 helps the operation plan making unit 120 to plan a restriction on the operation of other edge computer (properly selects a parameter to be restricted for causing no effect on machining).

Yet another variation of the present embodiment may be configured as follows. A contact or non-contact type vibration sensor is set on or near each edge computer or the floor and the like on which the edge computer is installed. The data collecting unit 100 collects the data on vibrations detected by the vibration sensor. The analyzing unit 110 analyzes the collected data on vibrations to determine the correlativity with the operational information on other edge computer. The vibration sensor allows the analyzing unit 110 to perform an analysis for determining the correlativity between the operational status of other edge computer and the actual vibrations at the machine tool 2. This enables the correlation analysis with higher precision. In addition, the analyzing unit 110 can determine which causes the deterioration in the product quality of a workpiece having been machined by the machine tool 2, vibrations or other factors. Thus, the analyzing unit 110 can perform an analysis with higher precision (excluding irrelevant data) for determining the correlation between the product quality of a workpiece having been machined by the machine tool 2 and the operational information on other edge computer. Moreover, yet another structure is possible in which the vibration sensor is connected to the network 5 via a computer and the like other than an edge computer, for data collection. This enables the analysis for determining the correlativity between the operational status of other edge computer and the actual vibrations at the machine tool 2 without activating the machine tool 2 as an edge computer. For example, this enables the analysis excluding the vibrations caused by the operation of the machine tool 2.

As yet another example, there is a case in which a plurality of edge computers are disposed at an almost equal distance from one machine tool 2, and the plurality of edge computers are of the same type and have the same specifications. In this case, for convenience, one machine tool 2 is paired with each edge computer, which makes a plurality of pairs of the machine tool 2 and one edge computer. These pairs are in similar relations with each other. In this case, the analyzing unit 110 compares the data from a pair with the data from another pair in a similar relation. When the data from a certain pair has a different tendency from the data from other pairs, the analyzing unit 110 may exclude the data having the different tendency as an outlier improper for the analysis. By doing this, the analyzing unit 110 can perform an analysis with higher precision (excluding the outlier data) for determining the correlation between the product quality of a workpiece having been machined by the machine tool 2 and the operational information on other edge computer.

Figure 8:
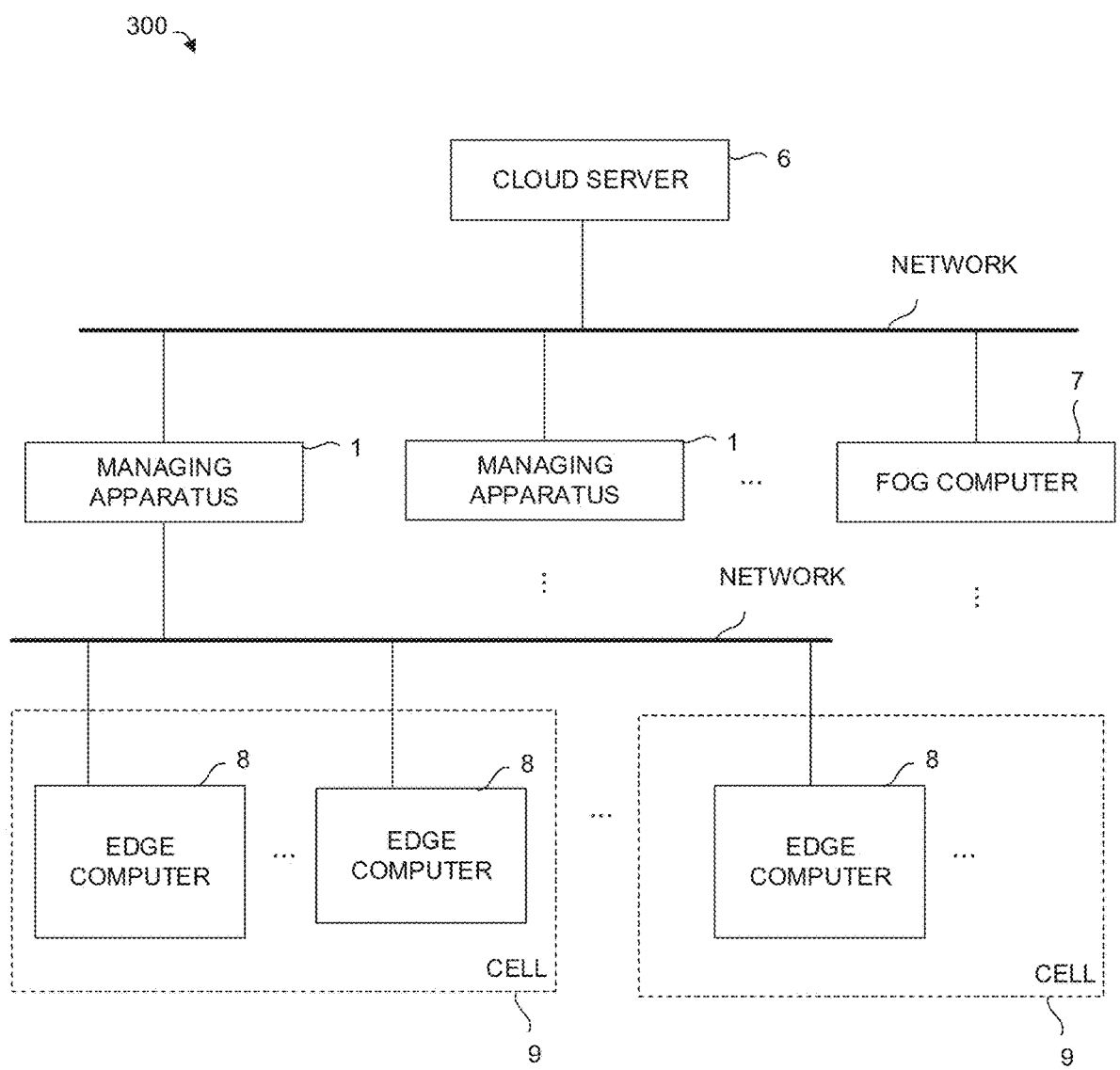
FIG. 8 is a schematic diagram showing the structure of a managing system according to a second embodiment.

FIG. 8 is a schematic diagram showing the structure of a managing system 300 with a plurality of managing apparatuses 1, according to a second embodiment. The managing system 300 shown in FIG. 8 as an example includes a plurality of managing apparatuses 1 implemented as fog computers. Each managing apparatus 1 manages a plurality of edge computers 8. The managing apparatus 1 has each function explained in the description of the first embodiment. The managing apparatus 1 is configured to exchange the data collected from the edge computers 8 under its control and the correlation information as the analytical result obtained through the analysis of the data, with other managing apparatus 1 directly or via a cloud server 6.

In the managing system 300 with this structure, the managing apparatus 1 can obtain the correlation information on the edge computers 8 having a similar layout to that of the edge computers 8 under its control from other managing apparatus 1 and use it. Thus, at the opening of a new factory, the managing apparatus 1 for the new factory can obtain the correlation information on the edge computers 8 having a similar layout from other managing apparatus 1, and use it for the management of the edge computers 8 in the new factory. This saves a lot of time and effort for collecting test data before the opening of the new factory.

Although some embodiments of the present disclosure have particularly been described above, the present disclosure is not limited to the above embodiments and can appropriately be modified and embodied in various ways.

The invention claimed is:

1. A managing apparatus for factory equipment in a manufacturing site in which a first machine tool for high-precision machining and at least one other machine are in operation, the managing apparatus configured for managing an operation of the other machine, the managing apparatus comprising:

a data collecting unit that collects at least quality information on a workpiece having been machined by the first machine tool and operational information on the other machine;

an analyzing unit that
retrieves information on the first machine tool and the other machine, when a positional relationship between the first machine tool and the other machine indicates a possibility that vibrations caused by the operation of the other machine affect the first machine tool, and
performs an analysis for determining correlation between the quality information on a workpiece having been machined by the first machine tool and the operational information on the other machine;

an operation plan making unit that makes an operation plan, based on the correlation determined by the analyzing unit, for imposing a restriction on an operation of the other machine to reduce vibrations to be transmitted to the first machine tool during high-precision machining performed by the first machine tool while both the first machine tool and the other machine perform the respective operation at the same time; and an operation instruction providing unit that provides an operation instruction to the other machine based on the operation plan made by the operation plan making unit, wherein the operation plan making unit is configured to make the operation plan further for lifting the restriction from the operation of the other machine in response to the high-precision machining by the first machine tool being completed, and the other machine is an air conditioner different from the first machine tool, and the restriction is a restriction on an airflow rate of the air conditioner.

2. The managing apparatus for factory equipment according to claim 1, wherein the managing apparatus reads a machining program for the first machine tool in advance and imposes the restriction on the other machine before the first machine tool starts planed high-precision machining.

3. The managing apparatus for factory equipment according to claim 1, wherein the restriction comprises an adjustment to at least one of a start time and a finish time for a predetermined operation of the other machine.

4. The managing apparatus for factory equipment according to claim 1, wherein the correlation is determined by machine learning.

5. The managing apparatus for factory equipment according to claim 1, wherein the data collecting unit further collects information on vibrations at the first machine tool, the vibrations being detected by a vibration sensor,
the analyzing unit performs an analysis for determining correlation between information on vibrations at the first machine tool and operational information on the other machine, and
the operation plan making unit makes the operation plan, based on the correlation between the information on vibrations and the operational information determined by the analyzing unit, for imposing the restriction on the operation of the other machine to reduce the vibrations to be transmitted to the first machine tool during the high-precision machining performed by the first machine tool.

6. A managing system having a plurality of managing apparatuses for factory equipment according to claim 1, the apparatuses being connected with each other via a network, wherein an analytical result provided by the analyzing unit is shared with each other among the managing apparatuses.

7. The managing apparatus for factory equipment according to claim 1, wherein the operation plan making unit is configured to make the operation plan that imposes the restriction on the operation of the other machine according to a predetermined operation restriction rule which is determined by a relationship of a degree of correlativity between a product quality of the workpiece having been machined by the first machine tool and the operational information on the other machine.

8. The managing apparatus for factory equipment according to claim 1, wherein the operation plan making unit is configured to make the operation plan that imposes the restriction on the operation of the other machine according to a predetermined operation restriction rule that is determined by a relationship of a degree of correlativity between a product quality of the workpiece having been machined by the first machine tool and the operational information on the other machine during finishing of the workpiece, and the predetermined restriction on a controllable operation of the other machine.

9. The managing apparatus for factory equipment according to claim 8, wherein the operation plan making unit is configured to determine a time zone in which the restriction is imposed on the operation of the other machine.

10. The managing apparatus for factory equipment according to claim 1, wherein
the analyzing unit is configured to compare data from a plurality of pairs, each pair including a machine tool and an edge computer, and
when the data from a certain pair among the plurality of pairs has a different tendency from the data from other pairs among the plurality of pairs, the analyzing unit is configured to exclude the data having the different tendency as an outlier improper for the analysis.

11. The managing apparatus for factory equipment according to claim 1, wherein the operational information on the other machine includes information on set temperature or environment of the air conditioner.

12. The managing apparatus for factory equipment according to claim 1, wherein the positional relationship between the first machine tool and the other machine indicates that the first machine tool and the other machine are in the same room, on the same floor, or on adjacent floors.

13. A managing apparatus for factory equipment in a manufacturing site in which a first machine tool for high-precision machining and at least one other machine are in operation, the managing apparatus configured for managing an operation of the other machine, the managing apparatus comprising:

a hardware processor configured to:

collect at least quality information on a workpiece having been machined by the first machine tool and operational information on the other machine;

retrieve information on the first machine tool and the other machine, when a positional relationship between the first machine tool and the other machine indicates a possibility that vibrations caused by the operation of the other machine affect the first machine tool, perform an analysis for determining correlation between (1) the quality information on a workpiece having been machined by the first machine tool and (2) the operational information on the other machine;

make an operation plan, based on the determined correlation, for imposing a restriction on an operation of the other machine to reduce vibrations to be transmitted to the first machine tool during high-precision machining performed by the first machine tool while both the first machine tool and the other machine perform the respective operation at the same time; and provide an operation instruction to the other machine based on the made operation plan, wherein the hardware processor is configured to make the operation plan further for lifting a restriction from the operation of the other machine in response to the high-precision machining by the first machine tool being completed, and wherein the other machine is an air conditioner different from the first machine tool, and the restriction is a restriction on an airflow rate of the air conditioner.

14. The managing apparatus for factory equipment according to claim 13, wherein the operational information on the other machine includes information on set temperature or environment of the air conditioner.

15. The managing apparatus for factory equipment according to claim 13, wherein the positional relationship between the first machine tool and the other machine indicates that the first machine tool and the other machine are in the same room, on the same floor, or on adjacent floors.

* * * * *